United States Patent
Hobara

(10) Patent No.: US 8,859,449 B2
(45) Date of Patent: Oct. 14, 2014

(54) FINE-PARTICLE STRUCTURE/SUBSTRATE COMPOSITE MEMBER AND METHOD FOR PRODUCING SAME

(75) Inventor: Daisuke Hobara, Kanagawa (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 13/131,342

(22) PCT Filed: Dec. 4, 2009

(86) PCT No.: PCT/JP2009/070379
§ 371 (c)(1),
(2), (4) Date: May 26, 2011

(87) PCT Pub. No.: WO2010/064699
PCT Pub. Date: Jun. 10, 2010

(65) Prior Publication Data
US 2011/0230336 A1    Sep. 22, 2011

(30) Foreign Application Priority Data
Dec. 4, 2008    (JP) ................. 2008-309445

(51) Int. Cl.
 *B01J 21/00* (2006.01)
 *B05D 1/12* (2006.01)
 *B32B 3/00* (2006.01)

(52) U.S. Cl.
USPC ............ 502/100; 427/180; 428/206

(58) Field of Classification Search
None
See application file for complete search history.

(56) References Cited

U.S. PATENT DOCUMENTS

| 2005/0255291 | A1 | 11/2005 | Iwata et al. | |
| 2007/0069365 | A1* | 3/2007 | Archer et al. | 257/700 |
| 2008/0191202 | A1* | 8/2008 | Hobara | 257/40 |
| 2009/0098381 | A1* | 4/2009 | Nakayama et al. | 428/402.22 |

FOREIGN PATENT DOCUMENTS

| JP | 2005-118697 | 5/2005 |
| JP | 2005-268531 | 8/2005 |
| JP | 2005-316450 | 11/2005 |
| JP | 2009-299119 | 12/2009 |

OTHER PUBLICATIONS

Arellano et al, "Silica-coated metals and semiconductors. Stabilization and nanostructuring" Pure Appl. Chem., vol. 72, Nos. 1-2, pp. 257-267, 2000.*

Alejandro-Arellano, "Silica-coated metals and semiconductors. Stabilization and nanostructuring", Pure Appl. Chem., 2000, pp. 257-267, vol. 72, Nos. 1-2.

* cited by examiner

Primary Examiner — Bijay Saha
(74) Attorney, Agent, or Firm — K&L Gates LLP

(57) ABSTRACT

In one example embodiment, a substrate having a smooth surface is prepared, a fine-particle layer including fine particles which are arranged along the surface is formed, and substituent molecules are bonded to the fine particles to change the fine-particle layer to a fine-particle assembly layer including the fine particles to which the substituent molecules are bonded, so that the center-to-center distance between the adjacent fine particles is increased to form a three-dimensional microstructure in which a portion of the fine-particle assembly layer is raised from the surface or the center-to-center distance between the adjacent fine particles is decreased to form a microstructure in which the fine-particle assembly layer is absent in a portion of the surface, the substrate being exposed in the absent portion.

18 Claims, 11 Drawing Sheets

FIG. 2
SCHEMATIC VIEW SHOWING SECTION OF ANOTHER EXAMPLE OF FINE-PARTICLE STRUCTURE/SUBSTRATE COMPOSITE MEMBER ACCORDING TO EMBODIMENT OF INVENTION
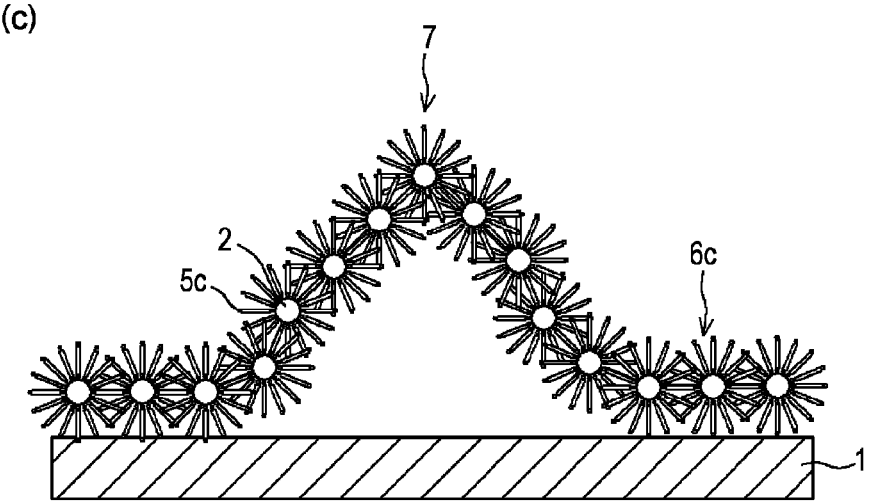
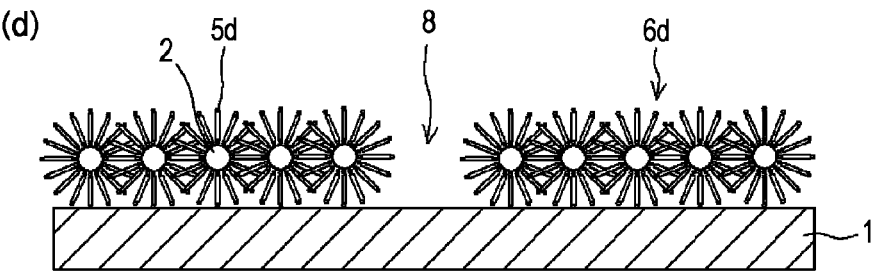

FIG. 4
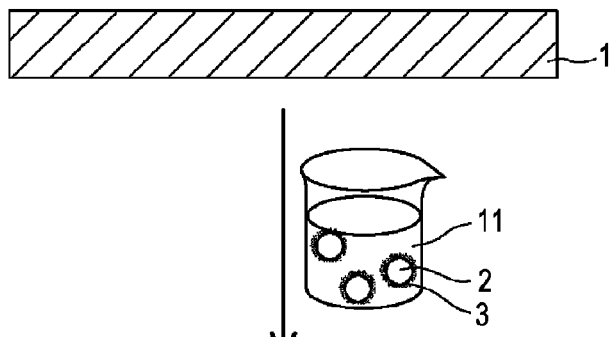
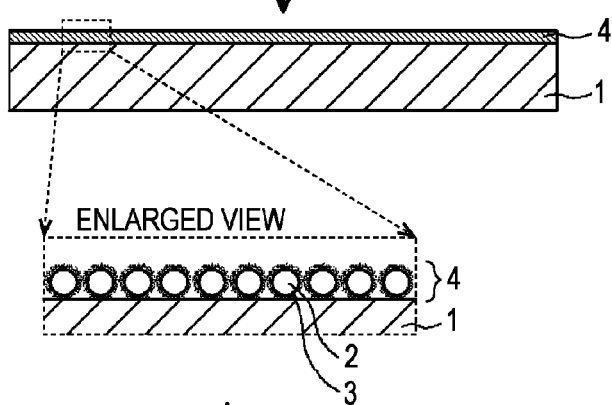
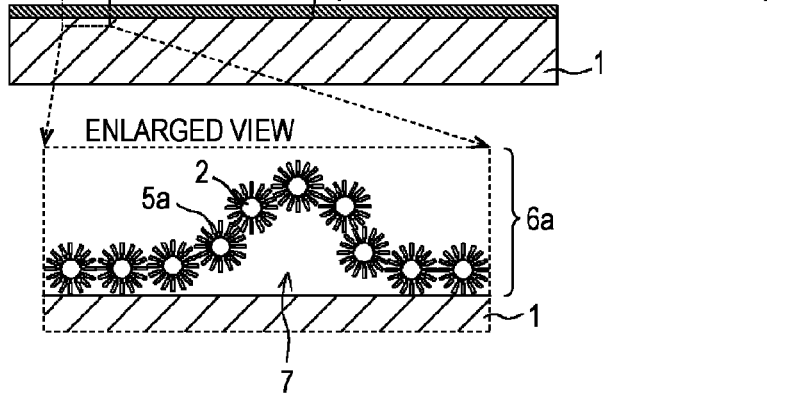

FIG. 5
STRUCTURAL FORMULA SHOWING SUBSTITUENT MOLECULE USED FOR FORMING FINE-PARTICLE STRUCTURE/SUBSTRATE COMPOSITE MEMBER ACCORDING TO EMBODIMENT OF INVENTION
(a) SUBSTITUENT MOLECULE A
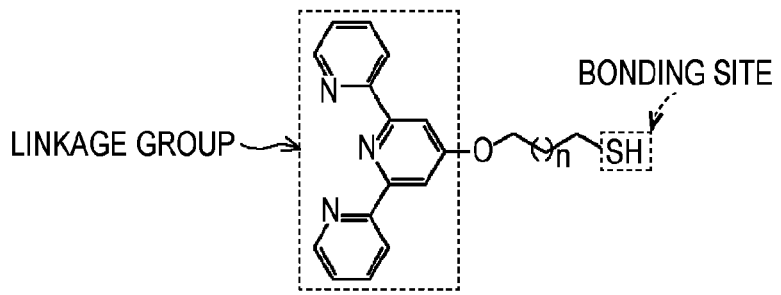
(b) SUBSTITUENT MOLECULE B
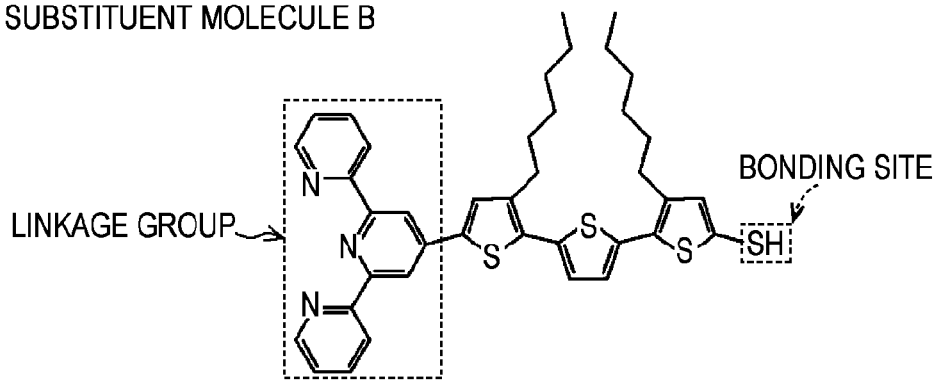
(c) SUBSTITUENT MOLECULE C ($HS(CH_2)_4SH$)
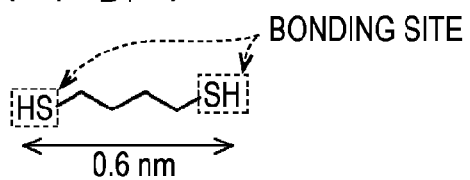

FIG. 7
SEM OBSERVATION IMAGES (a, b) OF FINE-PARTICLE ASSEMBLY LAYERS AND AFM OBSERVATION IMAGE (c) OF THREE-DIMENSIONAL RAISED STRUCTURE FORMED IN EXAMPLE 1 OF INVENTION
(a) DIPPING TIME = 2 HOURS
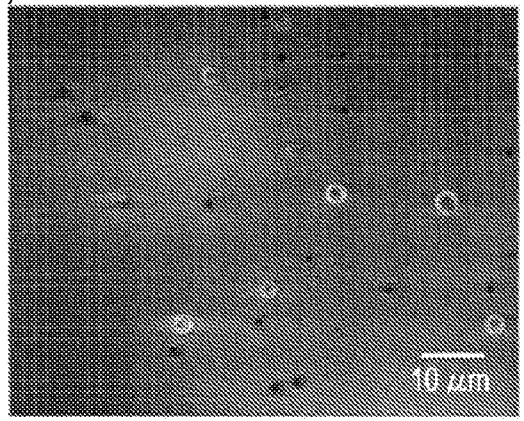
(b) DIPPING TIME = 18 HOURS
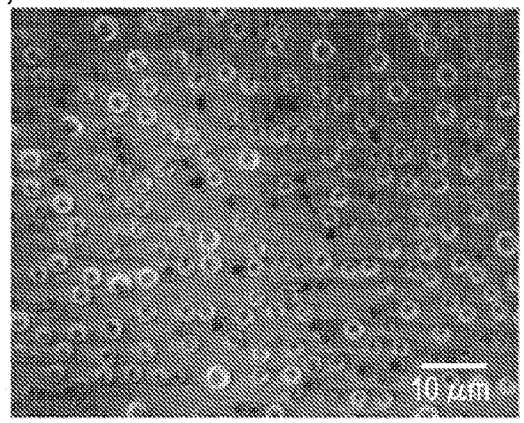
(c)
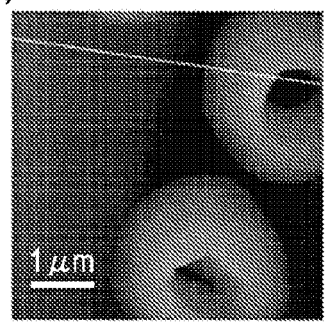
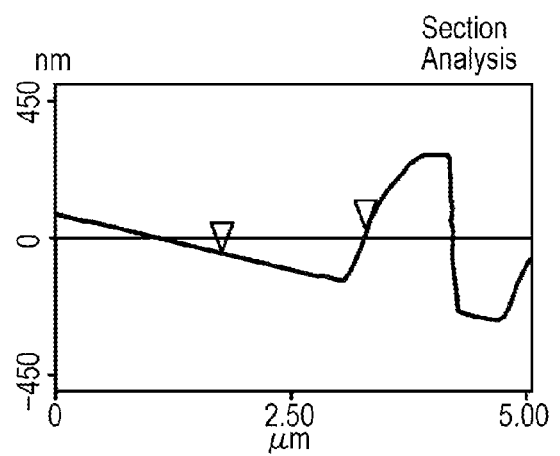

FIG. 8
SEM OBSERVATION IMAGE (a) OF ANOTHER FINE-PARTICLE ASSEMBLY LAYER AND AFM OBSERVATION IMAGE (b) OF THREE-DIMENSIONAL RAISED STRUCTURE FORMED IN EXAMPLE 1 OF INVENTION
(a)
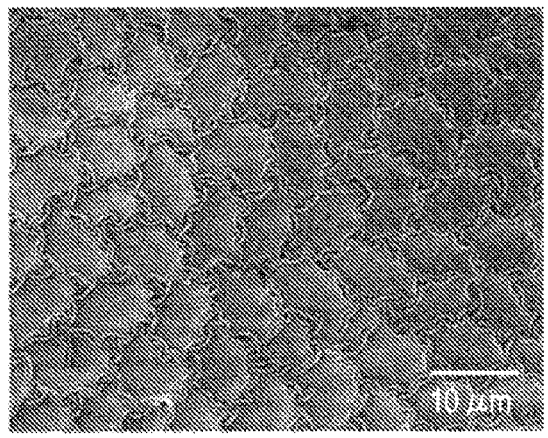
(b)
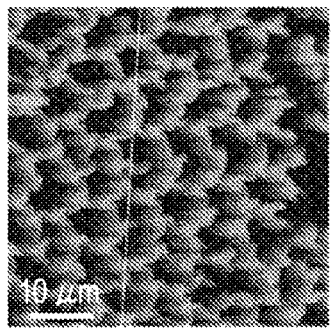 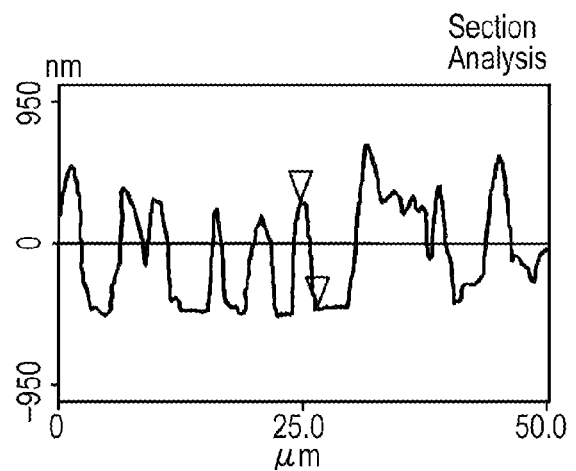

FIG. 9
SEM OBSERVATION IMAGE (a) OF FINE-PARTICLE ASSEMBLY LAYER AND SEM OBSERVATION IMAGE (b) OF THREE-DIMENSIONAL RAISED STRUCTURE FORMED IN EXAMPLE 2 OF INVENTION
(a)
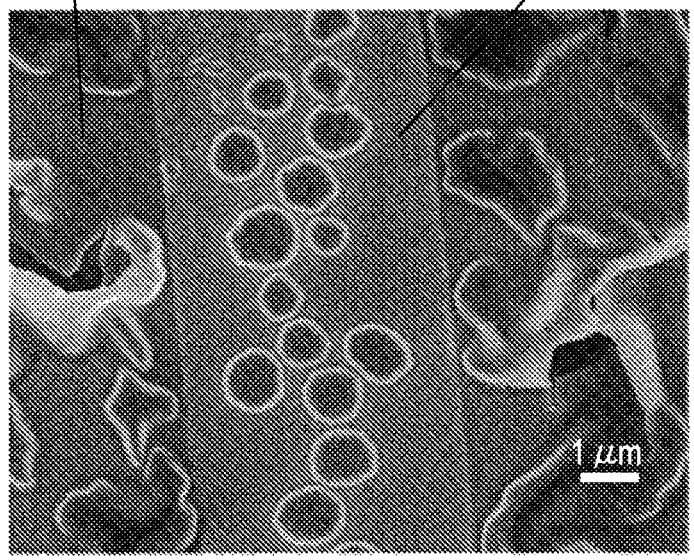
REGION WHERE THERMALLY OXIDIZED SILICON FILM IS EXPOSED
REGION WHERE GOLD LAYER IS FORMED
(b)
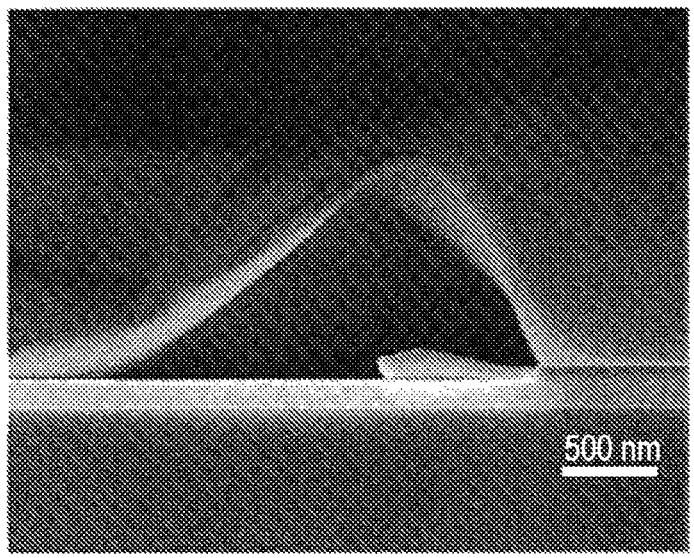

FIG. 10

SEM OBSERVATION IMAGES OF FINE-PARTICLE LAYER AND VARIOUS
FINE-PARTICLE ASSEMBLY LAYERS FORMED IN EXAMPLE 3 OF INVENTION (x) FINE-PARTICLE LAYER BEFORE REACTION WITH SUBSTITUENT MOLECULES

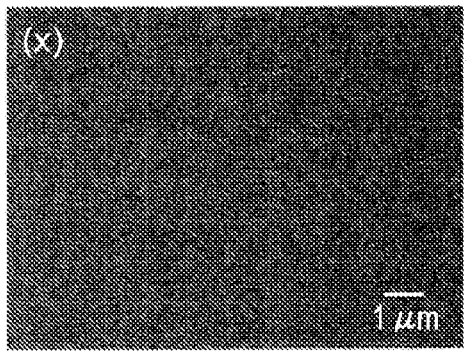

(a) FINE-PARTICLE ASSEMBLY LAYER ON 1,10-DECANEDITHIOL FILM

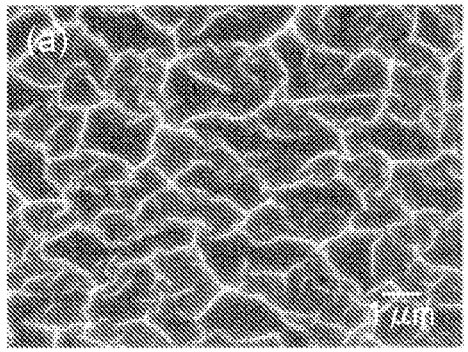

(b) FINE-PARTICLE ASSEMBLY LAYER ON 4-SULFANYLPYRIDINE FILM

(c) FINE-PARTICLE ASSEMBLY LAYER ON 2-NITRO-4-TRIFLUOROMETHYLBENZENE-1-THIOL FILM

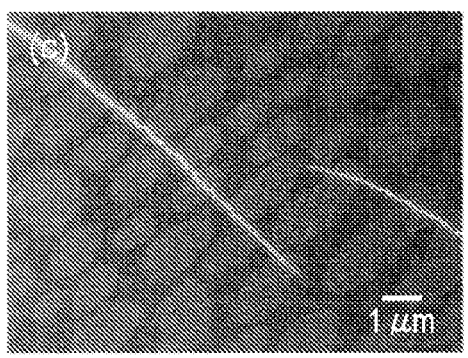

FIG. 11
SEM OBSERVATION IMAGES OF FINE-PARTICLE LAYER AND
FINE-PARTICLE ASSEMBLY LAYER FORMED IN EXAMPLE 4 OF INVENTION
(a) FINE-PARTICLE LAYER BEFORE REACTION
WITH SUBSTITUENT MOLECULES
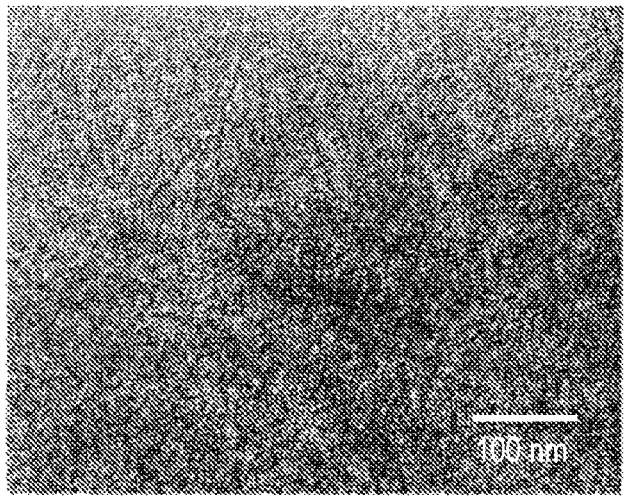
(b) FINE-PARTICLE ASSEMBLY LAYER
(FINE-PARTICLE LAYER AFTER REACTION
WITH SUBSTITUENT MOLECULE C)
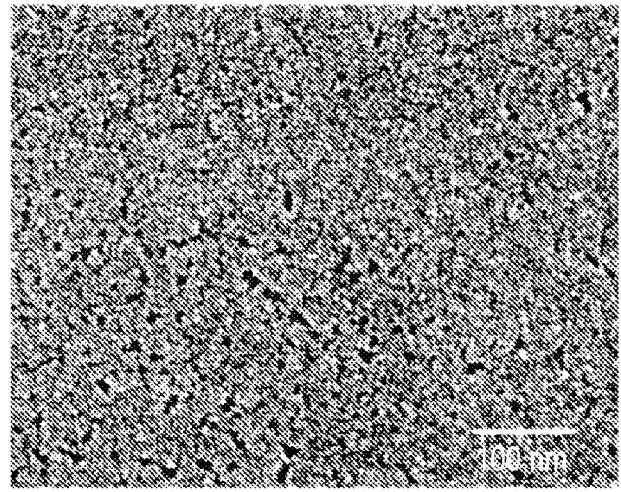

FINE-PARTICLE STRUCTURE/SUBSTRATE COMPOSITE MEMBER AND METHOD FOR PRODUCING SAME

BACKGROUND

In recent years, in development of science and technology aimed at extremely fine materials, such as nanoscience and nanotechnology, it has been proved that materials and devices having various new functions and properties can be formed by designing structures of atoms, molecules, or assemblies thereof with about several nm size. In this case, in order to induce a desired function and property, it is important to precisely control an arrangement state and assembly state of atoms or molecules.

As a material which satisfies this requirement, fine particles with a size of about several nm, i.e., nanoparticles, attract attention. In order to more effectively exhibit the characteristics of nanoparticles, it is important for the nanoparticles to be independently present and have good dispersibility without aggregation of the nanoparticles. In addition, in this specification, a size of 1 nm to less than 1 μm, typically about several nm to several tens nm, is referred to as "nanosize", and a member having the nanosize is named by adding the prefix "nano", for example, named "nanoparticles".

For a method for producing nanoparticles, various investigations have been made. At present, synthesis by various solution methods or vapor-phase methods is capable of not only controlling the particle size but also forming a monodispersion with a uniform size. In particular, unlike bulk materials, fine particles having a particle size of 10 nm or less not only have a very large surface area per unit mass but also exhibit a specific property due to the size, which is called a "quantum size effect". Therefore, synthesis is attempted by using various materials, and approaches to application to sensors, optical materials, electronic materials, battery material, and catalysts are made with basic research for elucidating new phenomena.

Although the characteristics of materials and devices composed of nanoparticles may be determined by the properties possessed by each fine particle, materials bonded to the surfaces of fine particles and an arrangement of fine particles, and further a structure and size of an assembly of fine particles frequently greatly influence the characteristics and contribute to effective improvement in performance.

For example, in an optical material or conductive material using nanoparticles, the distance between the fine particles is an important factor which determines the characteristics. In addition, it is considered to be advantageous for a sensor to have a structure which increases the frequency of collision between a material to be sensed and nanoparticles in a liquid phase or vapor phase, and for a catalyst to have a structure which increases the frequency of collision between a reactant and nanoparticles. In addition, in chemical vapor deposition of carbon nanotubes starting from nanosized catalyst metal fine particles, an arrangement of the nanotubes is directly determined by an arrangement of the metal fine particles (refer to, for example, Japanese Unexamined Patent Application Publication No. 2003-183012).

Therefore, in view of application of fine particles such as nanoparticles, a technique for arranging fine particles on a substrate, in addition to synthesis of the fine particles, becomes important.

A top-down micromachining technique represented by a lithography method and a probe drawing method is also effective for fine particles. For example, fine particles can be selectively arranged in a specified region on a substrate by a method of forming a micro pattern of a self-organizing film or the like on the substrate so that the substrate has surfaces having different interactions with the fine particles, and then fixing a fine particle layer only to a surface with strong interaction.

On the other hand, a bottom-up approach uses a method using a very small mold, represented by an in-print method disclosed in Non-Patent Literature 1 described below and a micro-contact method disclosed in Non-Patent Literature 2 described below.

CITATION LIST

Non Patent Literature

NPL 1: S. Y. Chou, P. R. Krauss and P. J. Renstrom, Appl. Phys. Lett., 67, 3114 (1995)

NPL 2: A. Kumar and G. M. Whitesides, Appl. Phys. Lett., 63, 2002 (1993)

A top-down micromachining technique represented by a lithography method and a probe drawing method is excellent in that a micropattern can be securely formed with high reproducibility, but has the problem of requiring a large apparatus. On the other hand, a bottom-up approach is advantageous in that a nanosized micropattern can be formed at low cost but has the problem with reliability, such as durability of a mold.

A conventional method for forming a micropattern is the same as that used for micromachining semiconductors. Therefore, the method is basically suitable for forming a two-dimensional micropattern of nanoparticle assemblies on a smooth substrate, but not suitable for producing a three-dimensional microstructure such as a hollow structure. In addition, when such a method is applied as a method for forming a micropattern of fine particle assemblies, a method requiring a step of heating to a high temperature cannot be used because the fine particles are fused with each other by heating when heated to a high temperature.

SUMMARY

The present disclosure has been achieved in consideration of this situation, and an object of the disclosure is to provide a fine-particle structure/substrate composite member including a microstructure, such as a three-dimensional raised structure, which is formed by an assembly of fine particles such as nanoparticles on a substrate, and a method producing the composite member without the need for a step of heating to a high temperature.

The present invention relates to a fine-particle structure/substrate composite member having a microstructure, such as a three-dimensional raised microstructure, which is formed by an assembly of fine particles, such as nanoparticles, on a substrate, and a method for producing the composite member without the need for a step of heating to a high temperature.

That is, the present disclosure relates to a method for producing a fine-particle structure/substrate composite member, the method including:

a step of preparing a substrate having a smooth surface;

a step of forming a fine-particle layer including fine particles which are closely arranged along the surface; and a step of bonding specified molecules to the fine particles to change the fine-particle layer into a fine-particle assembly layer including the fine particles to which the specified molecules are bonded, and increasing the center-to-center distance between the adjacent fine particles to form a three-dimensional microstructure in which the fine-particle assembly layer is raised from the surface within a region, or decreasing the center-to-center distance between the adjacent fine particles to form a microstructure in which the fine-particle assembly layer is absent in a region of the surface, and the substrate is exposed in this absent portion.

Also, the present disclosure relates to a fine-particle structure/substrate composite member including:

a substrate having a smooth surface; and a fine-particle assembly layer produced by bonding, in a fine-particle layer, specified molecules to fine particles which are closely arranged along the surface, the fine-particle assembly layer including the fine particles to which the specified molecules are bonded, and increasing the center-to-center distance between the adjacent fine particles to form a three-dimensional microstructure in which the fine-particle assembly layer is raised from the surface within a region, or decreasing the center-to-center distance between the adjacent fine particles to form a microstructure in which the fine-particle assembly layer is absent in a region of the surface, and the substrate is exposed in this absent portion.

In a method for producing a fine-particle structure/substrate composite member of the present disclosure, first, a step of preparing a substrate having a smooth surface; and a step of forming a fine-particle layer including fine particles which are closely arranged along the surface are performed. The surface of the substrate is required to be so smooth that the adjacent fine particles can sufficiently contact each other. Next, the thus-prepared fine particle layer is reacted with specified molecules to change the fine-particle layer into a fine-particle assembly layer including the fine particles to the surfaces of which the specified molecules are bonded. In this step, in the fine-particle assembly layer, the center-to-center distance between the adjacent fine particles is changed according to the molecular length of the specified molecules.

When the center-to-center distance between the adjacent fine particles is increased as compared with the center-to-center distance between the fine particles in the fine-particle layer, the surface area of the fine-particle assembly layer is increased as compared with the surface area of the fine-particle layer. Since the fine-particle assembly layer is disposed on the surface of the substrate with the same area as that of the fine-particle layer, stress occurs. As a result, the fine-particle assembly layer is raised from the surface within a region so as to relieve the stress, thereby spontaneously forming a three-dimensional microstructure.

In addition, when the center-to-center distance between the adjacent fine particles is decreased as compared with the center-to-center distance between the fine particles in the fine-particle layer, the surface area of the fine-particle assembly layer is decreased as compared with the surface area of the fine-particle layer. As a result, the entire surface of the substrate with the same area as that of the fine-particle layer cannot be covered with the fine-particle assembly layer, and the fine-particle assembly layer is absent in a region of the surface, thereby spontaneously forming a microstructure in which the substrate is exposed in the absent portion.

As described above, by bonding the specified molecules of a proper size to the fine particles, a very simple process without the need for the step of heating to a high temperature allows the fine-particle assembly layer to spontaneously form the three-dimensional microstructure in which the fine-particle assembly layer is raised from the surface or the microstructure in which the substrate is exposed in the portion where the fine-particle assembly layer is absent. The sizes and shapes of the three-dimensional structure and the absent portion vary depending on the various conditions, such as the size and particle size distribution of the fine particles, the thickness of the fine-particle layer, the structure (length, bulkiness, and the like) and flexibility of the specified molecules, and pre-treatment of chemically modifying the surface of the substrate. Therefore, various microstructures can be formed on the substrate surface according to the combination of the conditions.

A fine-particle structure/substrate composite member of the present disclosure is a fine-particle structure/substrate composite member which can be easily produced by the method for producing a fine-particle structure/substrate composite member of the present disclosure. When the three-dimensional microstructure in which the fine-particle assembly layer is raised from the surface is formed, the fine-particle assembly layer has a large surface area, and many hollow microstructures are present between the fine-particle assembly layer and the substrate, so that by appropriately selecting the material of the fine particles and/or the specified molecules, the composite member can be used as a member using the surface physical property of the fine-particle assembly layer, such as conductivity or surface wettability, and a member, such as a sensor or a catalyst device, which uses the surface of the fine-particle assembly layer and the hollow structures as reaction fields. In addition, when the fine-particle assembly layer is absent in a region of the surface, and the substrate is exposed in the absent portion, the member can be used as a member in which the function of the substrate is exhibited only in the absent portion.

Additional features and advantages are described herein, and will be apparent from the following Detailed Description and the figures.

BRIEF DESCRIPTION OF THE FIGURES

FIG. 2 is a conceptual view showing a section of another example of the fine-particle structure/substrate composite member.

FIG. 4 is a schematic sectional view showing a flow of steps for producing the fine-particle structure/substrate composite member.

FIG. 5 shows structural formulae representing examples of substituent molecules used for producing the fine-particle structure/substrate composite member.

FIG. 7 shows images (a, b) of fine-particle assembly layers formed in Example 1 of the present disclosure observed with a scanning electron microscope (SEM), and an image (c) of a three-dimensional raised structure observed with an atomic force microscope (AFM).

FIG. 8 shows a SEM observation image (a) of another fine-particle assembly layer formed in Example 1 of the present disclosure and an AFM observation image (b) of a three-dimensional raised structure.

FIG. 9 shows a SEM observation image (a) of a fine-particle assembly layer formed in Example 2 of the present disclosure and a SEM observation image (b) of a section of a three-dimensional raised structure.

FIG. 10 shows SEM observation images of a fine-particle layer and various fine-particle assembly layers formed in Example 3 of the present disclosure.

FIG. 11 shows SEM observation images of a fine-particle layer and a fine-particle assembly layer formed in Example 4 of the present disclosure.

DETAILED DESCRIPTION

Figure 1:
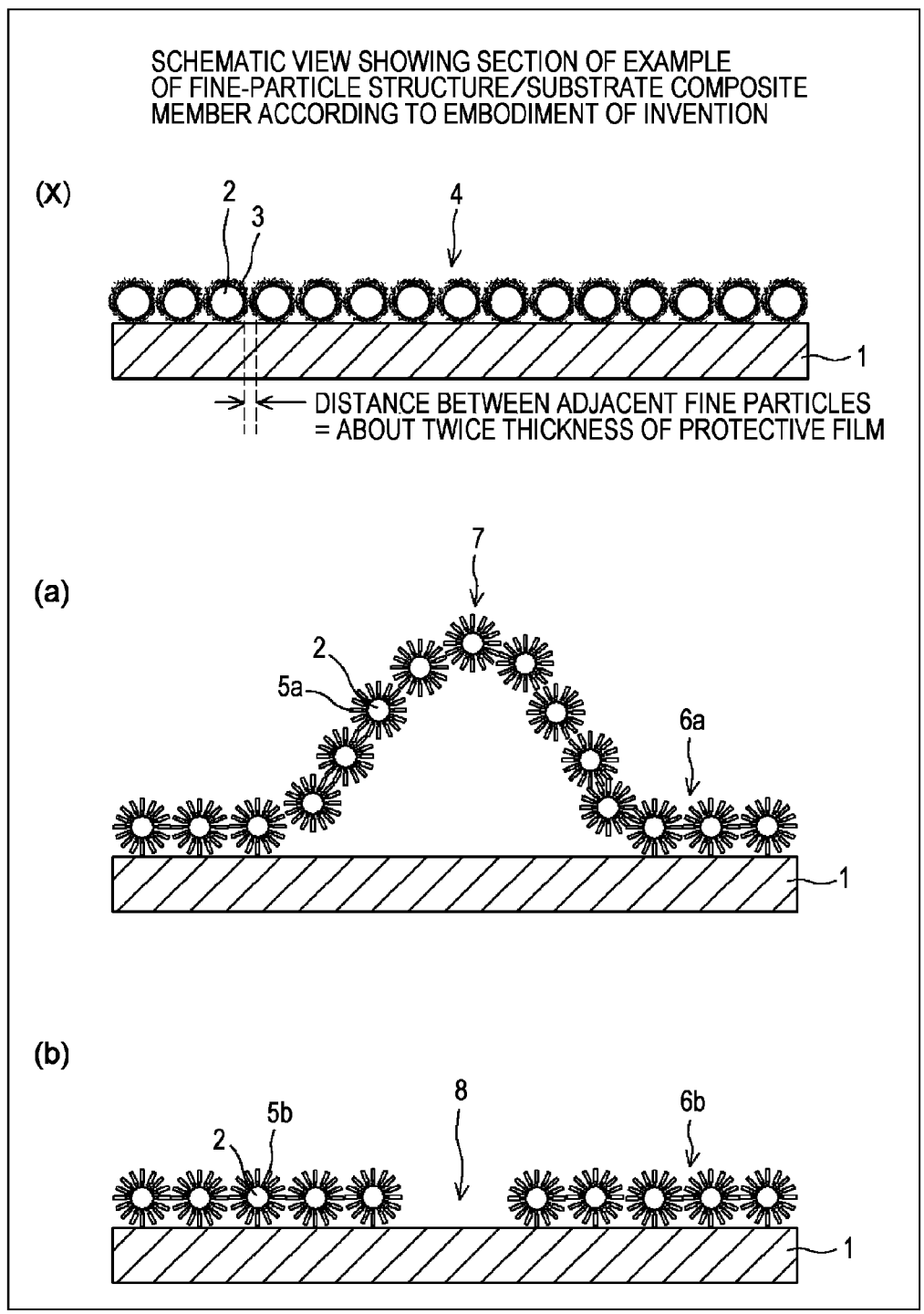
FIG. 1 is a conceptual view showing a section of an example of a fine-particle structure/substrate composite member according to an example embodiment of the present disclosure.

In a fine-particle structure/substrate composite member and a method for producing the composite member of the present disclosure, preferably, fine particles coated with protective film molecules which prevent aggregation or fusion of the fine particles are used as the fine particles, and the protective film molecules are substituted by the specified molecules. In order to prevent aggregation and fusion of fine particles, fine particles coated with protective film molecules or fine particles with films formed thereon and composed of a surface modifier for modifying the surfaces of the fine particles are generally used as the fine particles. In this specification, in a broad sense, the surface modifier is also regarded as protective film molecules and is included in the protective film molecules. In addition, when fine particles do not aggregate or fuse with each other without being coated with the protective film molecules, the protective film molecules are not necessarily required.

In addition, as the fine particles, nanoparticles having a nanosize particle diameter are preferably used. Since the nanoparticles have an extremely large surface area per unit mass, reaction or the like can be efficiently effected on the surfaces, and the performance of a sensor, an electrode, and a catalyst can be improved. In addition, application to a novel sensor, optical material, electronic material, battery material, and catalyst is expected from a specific property due to the size, which is called "quantum size effect". Although described over again, in the specification, a size of 1 nm to less than 1 μm, typically about several nm to several tens nm, is referred to as "nanosize", and a member having the nanosize is named by adding the prefix "nano", for example, named "nanoparticles".

In addition, as the specified molecules, molecules having, as a bonding site to be bonded to the fine particles, sulfanyl group —SH, disulfanyl group —S—S—, isocyano group —NC, thiocyanato group —SCN, carboxyl group —COOH, amino group —NH$_2$, cyano group —CN, selanyl group —SeH, tellanyl group —TeH, or phosphino group —PR$^1$R$^2$ (R$^1$ and R$^2$ are each H or an organic group) are preferably used. As described latter, these functional groups show strong bonding force to various fine particles.

In addition, functional molecules may be used as the specified molecules.

For example, in the fine-particle structure/substrate composite member of the present disclosure, the fine particles and the functional molecules preferably have conductivity. In this case, the fine-particle assembly layer with the three-dimensional microstructure formed therein may be preferably used as an electrode.

In addition, preferably, the functional molecules are fluorine-containing molecules, and the fine-particle assembly layer forms a super-water-repellent surface.

In addition, preferably, the fine particles and/or the functional molecules have a catalytic function, and the fine-particle assembly layer with the three-dimensional microstructure formed therein functions as a catalyst.

In addition, preferably, the substrate serves as an electrode, the fine particles and the functional molecules are lack of conductivity, and the electrode is exposed in the absent portion. According to the present disclosure, a structure in which the electrode is exposed in the absent portion can be easily formed without using a method such as lithography. Such a structure in which many microelectrodes are arranged on a surface can be used as a microelectrode array. In the microelectrode array, the rate of material supply from a solution to the electrode can be increased as compared with an electrode without a microstructure formed therein. As a result, for example, high-sensitivity electrochemical measurement can be performed by using the microelectrode array, and thus the microelectrode array can be used as a microanalytical electrode.

In the method for producing the fine-particle structure/substrate composite member of the present disclosure, preferably, the fine-particle layer is formed by a coating method, a printing method, a Langmuir-Blodgett method, a stamp method, a casting method, a liftoff method, or a dipping method.

Next, a preferred example embodiment of the present disclosure is specifically described in detail with reference to the drawings. In the example embodiment of the present disclosure, examples of a fine-particle structure/substrate composite member according to claims 7 and 8 and a method for producing the composite member according to claims 1 and 2 are mainly described.

FIGS. 1(*a*) and (*b*) are conceptual views each showing a section of an example of a fine-particle structure/substrate composite member according to an example embodiment of the present disclosure, and FIG. 1(*x*) is a conceptual view showing a section of a fine-particle layer 4 used as a base. FIG. 1 shows a case in which the fine-particle layer 4 is a single layer, and a fine-particle assembly layer 6*a* or 6*b* formed from the fine-particle layer 4 is also a single layer.

As shown in FIG. 1(*x*), first, fine particles 2 are arranged on a substrate 1, the surfaces of the fine particles 2 being coated with protective film molecules 3. This is because the nanosized fine particles 2 have the strong tendency to form aggregates by aggregation of the fine particles. Therefore, in order to prevent aggregation or fusion of the fine particles 2, the generally used fine particles 2 are coated with the protective film molecules 3 or have films formed thereon and composed of a surface modifier for modifying the surfaces of the fine particles 2. In the example embodiment, the surface modifier is also regarded as the protective film molecules 3 in a broad sense, and the case where protective films composed of the protective film molecules 3 are formed on the surfaces of the fine particles 2 is described.

A surface of the substrate 1 is required to be so smooth that the adjacent fine particles 2 in the fine-particle layer 4 can sufficiently contact each other. The fine particles 2 coated with the protective film molecules 3 are closely arranged along the surface of the substrate 1, for example, in a closest-packing state or a state close to the closest-packing state. Therefore, in the fine-particle layer 4, the distance between the two adjacent fine particles 2 (shortest distance between the surfaces of the two adjacent fine particles 2) is substantially equal to the total thickness (twice the thickness of each protective film) of the protective films formed on the two fine particles 2 and composed of the protective film molecules 3. Therefore, the distance between the two adjacent fine particles 2 can be appropriately controlled by appropriately selecting the molecular length of the protective film molecules 3.

The thus-prepared fine-particle layer 4 is reacted with substituent molecules 5 used as the specified molecules to substitute the protective film molecules by the substituent molecules 5 and change the fine-particle layer 4 to a fine-particle assembly layer 6 including the fine particles 2 to which the substituent molecules 5 are bonded, thereby forming a three-dimensional raised structure 7 or a absent portion 8 in the fine-particle assembly layer 6.

It is necessary for each of the substituent molecules 5 to have at least one bonding site to the fine particles 2. FIGS. 1(a) and (b) each show a case where substituent molecules 5a and 5b each have one bonding site to the fine particles 2. In this case, each of the substituent molecules 5 is bonded to one of the fine particles 2 at the bonding site and is bonded, by intermolecular force at the other end, to an end of the substitute molecule 5 bonded to the adjacent fine particle 2.

FIG. 1(a) shows a case where the molecular length of the substituent molecules 5a is substantially longer than the molecular length of the protective film molecules 3. In this case, the distance between the fine particles 2 is extended by the long substitute molecules 5 which enter between the adjacent fine particles 2, and thus the center-to-center distance of the fine particles 2 in the fine-particle assembly layer 6a is larger than the center-to-center distance of the fine particles 2 in the fine-particle layer 4. Therefore, the surface area of the fine-particle assembly layer 6a is also larger than the surface area of the fine-particle layer 4. When the fine-particle assembly layer 6a is disposed on the substrate 1 with the same area as the fine-particle layer 4, a three-dimensional shape is inevitably formed, in which a portion of the fine-particle assembly layer 6a does not fit on the plane and is partially raised. As a result, a steric three-dimensional raised structure 7 having a doughnut shape, a circular shape, or a honeycomb shape is spontaneously formed.

On the other hand, FIG. 1(b) shows a case where the molecular length of the substituent molecules 5b is substantially shorter than the molecular length of the protective film molecules 3. In this case, the distance between the adjacent fine particles 2 is occupied by the shorter substitute molecule 5b, thereby decreasing the distance between the fine particles. Consequently, the center-to-center distance of the fine particles 2 in the fine-particle assembly layer 6b is shorter than the center-to-center distance of the fine particles 2 in the fine-particle layer 4, and the surface area of the fine-particle assembly layer 6b is also smaller than the surface area of the original fine-particle layer 4. Therefore, the fine-particle assembly layer 6b cannot cover the entire surface of the substrate 1 with the same area as the fine-particle layer 4, and the fine-particle assembly layer 6b is absent in a portion of the surface. As a result, a microstructure is spontaneously formed, in which absent portions 8 such as cracks or gaps partially occur in the fine-particle assembly layer 6b, the substrate 1 being exposed in the absent portions 8.

FIGS. 2(c) and (d) are conceptual views showing sections of another example of the fine-particle structure/substrate composite member according to this example embodiment. FIGS. 2(c) and (d) show a case where each of the substituent molecules 5c and 5d has two bonding sites to the fine particles 2. In this case, some of the substituent molecules 5 are each bonded to one of the fine particles 2 at one of the bonding sites and bonded to the adjacent fine particle 2 at the other bonding site. In this way, when each of the substituent molecules 5 is bonded to the fine particles 2 so as to crosslink the two fine particles, the stable fine-particle assembly layer 6 having high mechanical strength is formed as compared with the case of one bonding site. Like in FIG. 1, FIG. 2 shows a case where the fine-particle layer 4 is a single layer, and the fine-particle assembly layer 6c or 6d formed therefrom is also a single layer.

Like in the case of one bonding site, even in the case of two bonding sites, different types of microstructures, which are roughly divided in two types, are formed according to the molecular length of the substituent molecules 5.

That is, FIG. 2(c) shows a case in which the molecular length of the substituent molecules 5c is substantially longer than a length (distance between the adjacent fine particles in the fine-particle layer 4) of twice the molecular length of the protective film molecules 3. In this case, the distance between the fine particles 2 is extended by the long substitute molecules 5c which enter between the adjacent fine particles 2, and thus the center-to-center distance of the fine particles 2 in the fine-particle assembly layer 6c is larger than the center-to-center distance of the fine particles 2 in the fine-particle layer 4. As a result, a portion of the fine-particle assembly layer 6c is partially raised to spontaneously form a steric three-dimensional raised structure 7 having a doughnut shape, a circular shape, or a honeycomb shape.

On the other hand, FIG. 2(d) shows a case where the molecular length of the substituent molecules 5d is substantially shorter than a length of twice the molecular length of the protective film molecules 3. In this case, since the distance between the adjacent fine particles 2 is occupied by the shorter substitute molecules 5d, the distance between the fine particles is decreased, and the center-to-center distance of the fine particles 2 in the fine-particle assembly layer 6d is shorter than the center-to-center distance of the fine particles 2 in the fine-particle layer 4. As a result, the fine-particle assembly layer 6d cannot cover the entire surface of the substrate 1 with the same area as the fine-particle layer 4, and the fine-particle assembly layer 6d is absent in a portion of the surface, thereby inevitably forming a microstructure in which absent portions 8 such as cracks or gaps partially occur in the fine-particle assembly layer 6d, the substrate 1 being exposed in the absent portions 8.

For example, as in examples described below, when gold fine particles with protective films which are composed of the protective film molecules 3 and have a thickness of about 0.6 nm are used as the fine particles 2, the protective films being in close contact with each other, the distance between the adjacent fine particles (shortest distance between surfaces) is 0.6 nm×2=about 1.2 nm. On the other hand, when linear alkane dithiol $HS(CH_2)_nSH$ is used as the substituent molecules 5, the molecular length of octane dithiol having a carbon number n of 8 is about 1.2 nm and is substantially equal to the distance. Therefore, when the protective film molecules 3 are substituted with octane dithiol, a change in the distance between the adjacent fine particles is considered to be minimized. In contrast, when $1<n<8$, as shown in FIG. 2(d), the absent portions 8 are formed in the fine-particle assembly layer 6d, while when $8<n$ ($<20$), as shown in FIG. 2(c), the three-dimensional raised structure 7 is formed in the fine-particle assembly layer 6c.

Figure 3:
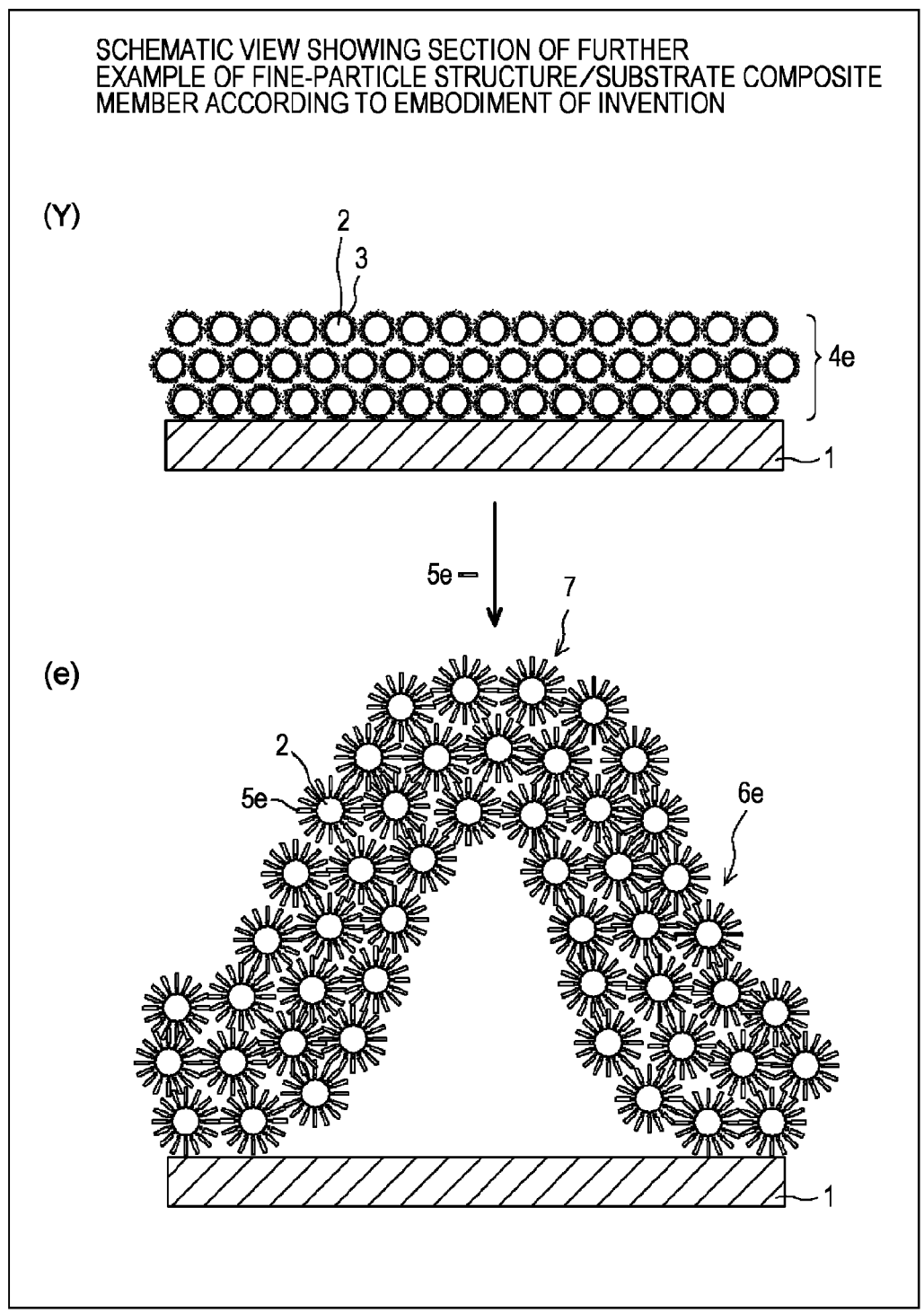
FIG. 3 is a conceptual view showing a section of a further example of the fine-particle structure/substrate composite member.

FIG. 3 is a conceptual view showing a section of a further example of the fine-particle structure/substrate composite member according to the example embodiment. FIG. 3(y) shows a section of a fine-particle layer 4e, and FIG. 3(e) shows a section of a fine-particle assembly layer 6e. This example is a case where the fine-particle layer 4e has a multilayer structure in which the fine particles 2 are laminated in plural layers, and the fine-particle assembly layer 6e formed from the fine-particle layer 4e also has a multilayer structure. Also, FIG. 3 shows an example in which like in the example shown in FIG. 1, each of the substituent molecules 5e has one bonding site to the fine particles 2. The case where each of the substituent molecules 5 has two or more bonding sites to the fine particle 2 may be considered to be the same as in FIG. 2 showing an example of a single layer.

Even when the fine-particle layer 4 has a multilayer structure, like in the case of a single layer, the microstructures formed are roughly divided into two types according to the molecular lengths of the substituent molecules 5 and the protective film molecules 3. Namely, when the molecular length of substituent molecules 5e is longer than that of the protective film molecules 3, substantially as shown in FIG. 3, a portion of the fine-particle assembly layer 6e is partially raised to form a steric three-dimensional raised structure 7 having a doughnut shape, a circular shape, or a honeycomb shape. However, when the fine-particle layer 4 is a multilayer film, it is necessary for the multilayer film to have such a small thickness that a necessary amount of the substituent molecules 5 can permeate from the surface to the lowermost layer (in contact with the substrate 1) of the fine-particle layer 4.

On the other hand, although not shown in the drawing, when the molecular length of the substituent molecules 5 is shorter than that of the protective film molecules 3, generally, absent portions 8 such as cracks or gaps are partially formed in the fine-particle assembly layer 6, and the substrate 1 is exposed in these portions.

As the material of the substrate 1, any material can be appropriately selected from a metal, a semiconductor, and an insulator. However, it is necessary for the substrate 1 to have such a smooth surface that the adjacent fine particles 2 in the fine-particle layer 4 can sufficiently contact each other. In addition, the three-dimensional raised structure 7 and the absent portion 8 in the fine-particle assembly layer 6 are formed by displacement of the fine particles on the surface of the substrate 1 when the protective film molecules 3 of the fine particles 2 are substituted by the substituent molecules 5. Therefore, a substrate which produces such strong interaction with the fine particles that displacement of the fine particles is impossible cannot be used as the substrate 1.

The three-dimensional raised structure 7 and the absent portion 8 vary depending on the strength of interaction between the substrate 1 and the fine particles 2 or between the protective film molecules 3 and the substituent molecules 5. Therefore, when the surface of the substrate 1 is patterned into two or more regions having different properties, the fine-particle assembly layer 6 having different three-dimensional structures 7 or absent portions 8 in the respective regions can be formed.

The fine particles 2 are nanoparticles having a diameter of about 100 nm or less. As the material of the fine particles 2, any material can be appropriately selected from a metal, a semiconductor, and an insulator according to the properties of the fine-particle assembly layer 6 to be formed. However, when a fine-particle layer with high conductivity is formed as the fine-particle assembly layer 6, it is necessary to use the fine particles 2 with a particle diameter size of about 5 nm or more because even with fine particles composed of a metal, conductivity decreases as the diameter decreases to such a level that the quantum size effect is exhibited. In addition, the smaller the variation in size of the fine particles, the more easily the three-dimensional raised structure 7 having a regular structure and the absent portion 8 are formed.

The protective film molecules 3 and the surface modifier are required to have weaker bond strength to the fine particles 2 than that between the substituent molecules 5 and the fine particles 2 so as to be suitable for substitution by the substituent molecules 5. Therefore, as the protective film molecules 3, for example, an aliphatic amine, an aliphatic amide, an aliphatic alcohol, an aliphatic carboxylic acid, an aliphatic ester, and an aliphatic phosphine are preferably used.

Examples of a functional group which the substitute molecules 5 have as the bonding site to the fine particles include a sulfanyl group —SH, a disulfide group —S—S—, a selenol group —SeH, a tellulol group —TeH, an amino group —NH$_2$, a phosphino group —PR$^1$R$^2$ (wherein R$^1$ and R$^2$ are each a hydrogen atom or an organic group), a cyano group —CN, a thioisocyanide group —SCN, an isocyano group —NC, and a carboxyl group —COOH. Examples of combination of the functional group and a constituent material of the fine particles to which the functional group can be bonded include the following:

—SH . . . Au, Ag, Pt, Pd, Cu, Fe, SnS, SnSe, SnTe, PbS, PbSe, PbTe, InP, InAs, InSb, GaP, GaAs, GaSb, ZnS, ZnSe, ZnTe, CdS, CdSe, CdTe

—S—S— . . . Au, Ag, Pt, Pd, Cu, Fe, SnS, SnSe, SnTe, PbS, PbSe, PbTe, InP, InAs, InSb, GaP, GaAs, GaSb, ZnS, ZnSe, ZnTe, CdS, CdSe, CdTe

—SeH . . . Au, Ag, Pt, Pd, Cu, Fe, SnS, SnSe, SnTe, PbS, PbSe, PbTe, InP, InAs, InSb, GaP, GaAs, GaSb, ZnS, ZnSe, ZnTe, CdS, CdSe, CdTe

—TeH . . . Au, Ag, Pt, Pd, Cu, Fe, SnS, SnSe, SnTe, PbS, PbSe, PbTe, InP, InAs, InSb, GaP, GaAs, GaSb, ZnS, ZnSe, ZnTe, CdS, CdSe, CdTe

—NH$_2$ . . . Au, Ag, Pt, Pd, Cu, Fe, SnS, SnSe, SnTe, PbS, PbSe, PbTe, InP, InAs, InSb, GaP, GaAs, GaSb, ZnS, ZnSe, ZnTe, CdS, CdSe, CdTe, TiO$_2$, ZnO, In$_2$O$_3$, NiO, VO$_2$, SnO$_2$

—PR$^1$R$^2$ . . . Au, Pd, Pt, Rh, Ni, TiO$_2$, ZnO, In$_2$O$_3$, NiO, VO$_2$, SnO$_2$

—CN . . . Au

—SCN . . . Au, Ag, Pt, Pd, Cu, Fe

—NC . . . Au, Ag, Pt, Pd

—COOH . . . Au, Ag, TiO$_2$, ZnO, In$_2$O$_3$, NiO, VO$_2$, SnO$_2$

Molecules having such a functional group and being chemically adsorbed on the fine particles 2 can also be used as the protective film molecules 3 or the surface modifier. In this case, however, the protective film molecules 3 or the surface modifier is required to have weaker bonding force to the fine particles 2 than that of the substituent molecules 5, which are subsequently bonded to the fine particles 2, so that the substitution reaction by the substituent molecules 5 is not inhibited.

For example, when the fine particles 2 are gold fine particles, molecules having amino group —NH$_2$ or phosphino group —PR$^1$R$^2$ can be substituted by molecules having a sulfanyl group because of strong bonding between gold and the sulfanyl group —SH. Therefore, molecules having an amino group or phosphino group can be used as the protective film molecules 3, and molecules having a sulfanyl group can be used as the substituent molecules 5. Details of such a substitution reaction have been reported (refer to Marvin G. Warner, James E. Hutchison (2003) In: Marie-Isabelle Baratoned (ed.), Synthesis and assembly of functionalized Gold Nanoparticles, "Synthesis Functionalization and Surface Treatment of Nanoparticles", American Scientific Publishers, USA, p. 67-89).

In the fine-particle structure/substrate composite member according to the example embodiment of the disclosure, when the three-dimensional raised structure 7 in which the fine-particle assembly layer 6 is raised from the surface is formed, the fine-particle assembly layer 6 has a large surface area, and many hollow microstructures are present between the fine-particle assembly layer 6 and the substrate 1.

By appropriately selecting the material of the fine particles 2 and/or the substituent molecules 5, the composite member can be used as a member using the surface physical property, such as conductivity or surface wettability, of the fine-particle assembly layer 6. For example, the electric conductivity of the fine-particle assembly layer 6 can be controlled by the material and size of the fine particles 2 or the type and length of the substitute molecules 5 to be bonded. Therefore, a surface having a desired antistatic effect can be obtained by using the fine-particle assembly layer 6. In particular, when the fine particles 2 are composed of a metal, and the substituent molecules 5 to be bonded to the fine particles 2 are molecules having high electric conductivity, such as conjugated molecules, the electric conductivity of the fine-particle assembly layer 6 is also increased, and thus the fine-particle assembly layer 6 having the three-dimensional raised structure 7 formed therein can be applied as an electrode having a large surface area.

In addition, the surface wettability of the fine-particle assembly layer 6 can be controlled by the properties of the substituent molecules 5. Therefore, a surface having desired wettability can be obtained by using the fine-particle assembly layer 6. In addition, water repellency of a solid surface is determined by surface free energy and a surface microstructure, but a super-water-repellent surface can be obtained by, for example, using fluorine-containing molecules having large surface energy as the substituent molecules 5 and forming the three-dimensional raised structure 7.

In addition, by appropriately selecting the material of the fine particles 2 and/or the substituent molecules 5, the composite member can be used as a member, such as a sensor or a catalyst device, which utilizes the surface of the fine-particle assembly layer 6 having a large surface area or the hollow structure formed between the fine-particle assembly layer 6 and the substrate 1 by allowing it to function as a chemical reaction field with high reaction efficiency. The fine-particle structure/substrate composite member can be used as a chemical reaction reactor with high performance by allowing it to function as a chemical reaction field with high reaction efficiency.

In particular, when materials having a catalytic action are used for the fine particles 2 and the substituent molecules 5, catalytic chemical reaction can be proceeded in the reaction field, and the fine-particle structure/substrate composite member is allowed to function as a catalytic reactor. In addition, even when the substituent molecules 5 do not have the catalytic action, molecules functioning as a catalyst can be added to the molecules 5 and bonded to the fine particles 2. In this case, an enzyme can be used as the substituent molecules 5 having catalytic activity or the molecules to be added.

In addition, when the fine-particle assembly layer 6 is absent in a region of the surface of the substrate 1, and the substrate 1 is exposed in this absent region 8, the fine-particle structure/substrate composite member according to the example embodiment can be used as a member which exhibits the function of the substrate 1 only in the absent region 8. For example, a structure in which an electrode is exposed in a portion with a nanosize width can be formed by using a substrate composed of a material with high electric conductivity as the substrate 1 used as an electrode and using materials with low electric conductivity for the fine particles 2 and the substituent molecules 5 to be bonded to the fine particles 2.

FIG. 4 is a schematic sectional view showing a flow of steps for producing the fine-particle structure/substrate composite member having the three-dimensional raised structure according to the example embodiment.

First, as shown in FIG. 4(*a*), for example, the clean substrate 1, such as a silicon substrate, is prepared, in which a surface is mirror-finished and a thermally oxidized film is formed on the surface. On the other hand, a dispersion solution 11 is prepared by dispersing, in a proper solvent, the fine particles 2 with the surfaces coated with the protective film molecules 3. The solvent is not particularly limited but, for example, toluene, cyclohexane, or chloroform is used.

Next, as shown in FIG. 4(*b*), the fine-particle layer 4 including the fine particles 2 coated with the protective film molecules 3 is formed on the substrate 1 using the dispersion solution 11. The method for forming the fine-particle layer 4 is not particularly limited, but a coating method, a printing method, a Langmuir-Blodgett method (LB method), a stamp method, a casting method, a liftoff method, or a dipping method is appropriately used.

In the LB method, the dispersion solution 11 prepared by dispersing the metal fine particles 2 coated with the protective film molecules 3 in a solvent such as toluene or chloroform is spread on a standing water surface, and then the solvent is evaporated to form the fine-particle layer including the metal fine particles 2 coated with the protective film molecules 3 on the water surface. Next, the fine-particle layer is transferred onto the substrate 1 disposed under the water surface by a surface lowering method or the like. The LB method is advantageous in that the thickness can be easily controlled by the concentration and amount of the dispersion solution 11 spread on the water surface, surface pressure, etc, and is also capable of forming a single-layer film of the fine particles 2 coated with the protective film molecules 3.

In the stamp method, first, a fine-particle film including the fine particles 2 coated with the protective film molecules 3 is formed on a solid surface or water surface by the casting method or the LB method. The fine-particle film is transferred to a surface of a transfer medium composed of polydimethylsiloxane or the like, and the transfer medium is pressed on the substrate 11 like a stamp to dispose the fine-particle layer 4 on the surface of the substrate 1.

In a method other than the above, the dispersion solution 11 is disposed on the substrate 1, and then the solvent is evaporated to directly form the fine-particle layer 4 including the fine particles 2 coated with the protective film molecules 3 on the substrate 1. The method for disposing the dispersion solution 11 on the substrate 1 is not particularly limited, but in the coating method, a cast coater method, a spray coater method, or a spin coat method can be used, while in the printing method, an ink jet printing method, a screen printing method, an offset printing method, or a gravure printing method can be used. In the casting method, the dispersion solution 11 is dropped on the substrate 1, and the solvent is gradually evaporated. In the dipping method, the substrate 1 is dipped in the dispersion solution 11 for several minutes to several hours, and then the solvent is evaporated. In the liftoff method, a photoresist layer is previously patterned on the substrate 1 by lithography or the like, the fine-particle layer is formed over the entire surface of the substrate 1 including the photoresist layer, and then the photoresist layer is removed together with the fine-particle layer deposited thereon to selectively leave the fine-particle layer deposited directly on the substrate 1, thereby forming the patterned fine-particle layer.

Next, as shown in FIG. 4(*c*), the substrate 1 on which the fine-particle layer 4 including the fine particles 2 coated with the protective film molecules 3 is formed is brought into contact with a solution or gas containing the substituent molecules 5. This treatment allows the protective film molecules 3 to be substituted by the substituent molecules 5. As a result, the distance between the fine particles 2 is changed to form the fine-particle assembly layer 6*a* having the three-dimensional raised structure 7.

The protective film molecules 3 are used for the purpose of preventing fusion or aggregation of the fine particles 2. Therefore, when the fine particles 2 are fine particles which do not have the property of gathering to produce fusion or aggregation of the fine particles, the protective film molecules 3 need not be used. In this case, the protective film molecules 3 previously bonded to the fine particles 2 need not be removed by substitution with the specified molecules, thereby facilitating the selection of the specified molecules (eliminating the limitation that the substituent molecules 5 subsequently bonded to the fine particles 2 are required to have stronger bonding force to bond to the fine particles 2 than that of the protective film molecules 3 previously bonded to the fine particles 2).

FIG. 5 shows structural formulae representing examples of the substituent molecules 5 used for producing the fine-particle structure/substrate composite member of the example embodiment. Substituent molecules A and B shown in FIGS. 5(a) and (b), respectively, are examples of substituent molecules each having a sulfanyl group —SH as a bonding site bonded to the fine particles 2. Substituent molecule C shown in FIG. 5(c) is an example of substituent molecules each having two sulfanyl groups as bonding sites bonded to the fine particles 2.

Since the substituent molecules A and B each have only one bonding site bonded to the fine particles 2, in the fine-particle assembly layer 6, one (bonding site) of the ends of the molecule is bonded to one of the fine particles 2, and the other end is bonded, by intermolecular force, to an end of the substituent molecule bonded to the adjacent fine particle 2. In this case, there is the weak point that the mechanical strength of the three-dimensional raised structure 7 is weaker than that of the case where like in the substituent molecule C, both ends of the molecule are bonded to the fine particles 2 so as to crosslink the two fine particles.

Even with such substituent molecules, when the other end of the molecule functions as a linkage group which connects together substituent molecules by chemical bonding, a three-dimensional raised structure having the same mechanical strength as that of substituent molecules having two bonding sites can be formed. For example, the other end of each of the substituent molecules A and B is a terpyridyl group which can function as a ligand of an organic metal complex. In this case, a complex structure can be formed between the adjacent substituent molecules 5 by supplying a central metal ion required for forming the complex structure, so that the substituent molecules 5 can be connected by chemical bonding (refer to, for example, Japanese Unexamined Patent Application Publication No. 2008-153257).

Figure 6:
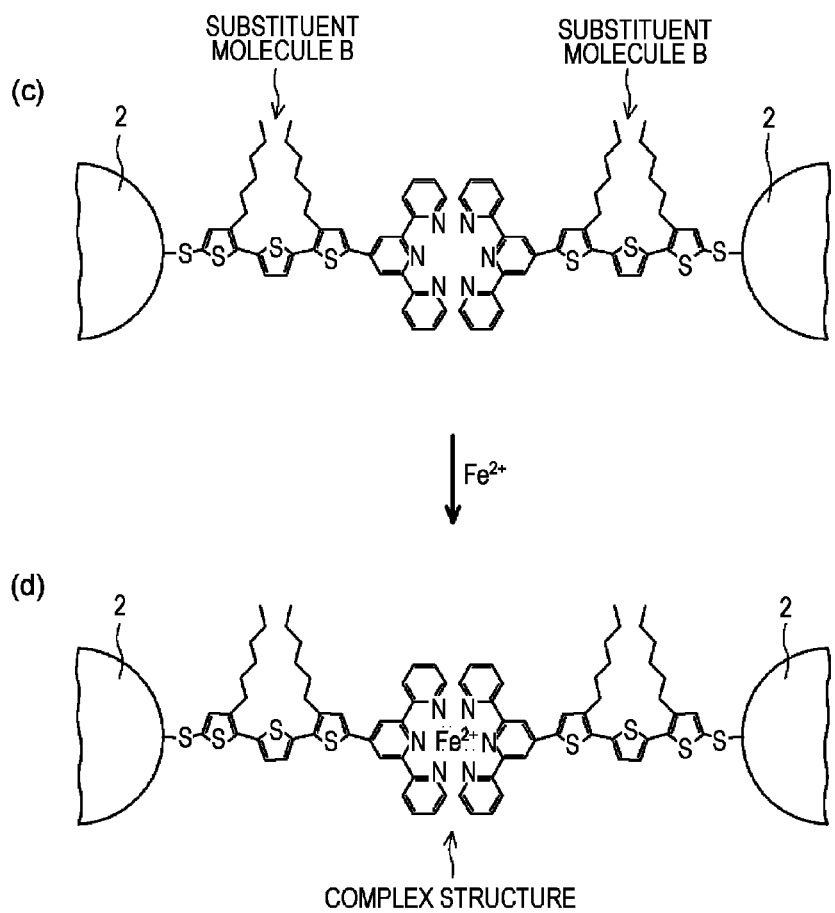
FIG. 6 shows structural formulae representing an example of a post-treatment step for substitute molecules, the step being added to the steps for producing the fine-particle structure/substrate composite member.

FIG. 6 illustrate structural formulae showing a post-treatment step for the substituent molecules 5, the step being added to the steps for producing the fine-particle structure/substrate composite member shown in FIG. 4. In this step, after the substituent molecules 5 such as the substituent molecules A and B are bonded to the fine particles 2, the substrate 1 is dipped in an ethanol solution containing central metal ion. With the substituent molecule A or B having a terpyridyl group as a ligand, a bis-terpyridyl complex is formed by supplying, as the central metal ion, $Mn^{2+}$, $Fe^{2+}$, $Co^{2+}$, $Ni^{2+}$, $Cu^{2+}$, $Zn^{2+}$, or $Ru^{2+}$ so as to crosslink the fine particles 2.

According to the production method of the example embodiment, a three-dimensional microstructure in which the fine-particle assembly layer 6 is raised in a doughnut form, a circular form, or a honeycomb form, or a microstructure having a absent portion such as a nanosized crack or gap can be formed on the substrate 1 by a very simple process of reacting the fine-particle layer 4 formed on the substrate with the substituent molecules 5.

EXAMPLE 1

In examples, description is made of the results of observation of the fine-particle assembly layer described in the example embodiment and the three-dimensional raised structure with a scanning electron microscope (SEM) and an atomic force microscope (AFM), the fine-particle assembly layer being formed on a surface of each of various substrates. In this case, gold fine particles having a diameter of 4.7±1.1 nm, which was estimated from an image observed with a scanning electron microscope, were used as the fine particles 2. In addition, alkylamine having a molecular length of about 0.6 nm was used as the protective film molecules 3, and the gold fine particles 2 coated with the protective films 3 having a thickness of about 0.6 nm were used.

In Example 1, a fine-particle assembly layer 6 was formed on a surface of a silicon substrate on which a thermally oxide film was formed.

First, a silicon substrate with a mirror-finished surface on which a thermally oxidized film was formed was prepared as the substrate 1.

Next, a fine-particle film composed of the fine particles 2 coated with the protective film molecules 3 was formed by the Langmuir-Blodgett (LB) method. First, the gold fine particles 2 coated with the protective film molecules 3 were dispersed in toluene at a concentration of 30% by mass. Then, 20 µL of the resultant dispersion solution was cast on a water surface with a pipette, and toluene was evaporated to form the fine-particle film composed of the fine particles 2 coated with the protective film molecules 3 on the water surface. In addition, the concentration of 30% by mass is the percent by mass including the protective film molecules, but mainly includes the mass of the gold fine particles.

Then, the fine-particle film was transferred onto the silicon substrate 1, producing a fine-particle layer 4e composed of the fine particles 2 coated with the protective film molecules 3.

Next, the substituent molecules A (refer to FIG. 5(a); n=7) were dissolved as the substituent molecules 5 in methanol at a concentration of 1 mM. The substrate 1 on which the fine-particle layer 4 was formed was dipped in the resultant solution for a predetermined time. Then, the substrate 1 was taken out and washed with methanol. This treatment allows the protective film molecules 3 to be substituted by the substituent molecules A, thereby forming a fine-particle assembly layer 6e having the three-dimensional raised structure 7.

FIGS. 7(a) and (b) each show a SEM observation image of the fine-particle assembly layer 6e formed as described above. FIG. 7(a) shows the case of a dipping time of 2 hours, and FIG. 7(b) shows the case of a dipping time of 18 hours.

The molecular length of the substituent molecules A is about 1.8 nm and larger than the thickness (molecular length of the protective film molecules) of the protective film of about 0.6 nm. Example 1 is an example in which, as shown in FIG. 3, the molecular length of substituent molecules 5e is longer than the molecular length of the protective film molecules 3. In this case, the distance between the fine particles 2 is extended by the longer substituent molecule 5e which enters between the adjacent fine particles 2. As a result, the center-to-center distance of the fine particles 2 in the fine-particle assembly layer 6e is increased to be larger than the center-to-center distance between the fine particles 2 in the fine-particle layer 4. Therefore, the surface area of the fine-particle assembly layer 6e is also larger than the surface area of the original fine-particle layer 4. When the fine-particle assembly layer 6e is disposed on the substrate 1 with the same area as the fine-particle layer 4, a portion of the fine-particle assembly layer 6e does not fit on the plane, inevitably forming a three-dimensional shape in which the fine-particle assembly layer 6e is partially raised. As a result, the three-dimensional raised structure 7 having a doughnut shape, a circular shape, or a honeycomb shape is formed.

In any one of FIGS. 7(a) and (b), the three-dimensional raised structure 7 raised in a doughnut shape is actually observed in the fine-particle assembly layer 6e, and it was found that the density increases as the dipping time increases. FIG. 7(c) shows an AFM observation image of the three-dimensional raised structure 7 raised in a doughnut shape. The height of the three-dimensional raised structure 7 is about 5 μm.

FIG. 8 shows a SEM observation image (a) and an AFM observation image (b) of a fine-particle assembly layer 6e having a three-dimensional raised structure 7 raised in a honeycomb shape formed under the same conditions. The AFM observation image indicates that the height of the three-dimensional raised structure 7 raised in a honeycomb shape is about 5 to 10 μm.

At present, conditions for selectively forming the doughnut-shaped structure shown in FIG. 7 or the honeycomb-shaped structure shown in FIG. 8 are not completely known. The doughnut-shaped structure tends to be formed relatively anywhere on the substrate, while the honeycomb-shaped structure tends to be mostly formed in a central portion of the substrate. In addition, the dipping times for easily forming the respective structures are slightly different, but it is impossible to control to necessarily form one of the structures by controlling only the dipping time.

In Example 2, a fine-particle assembly layer 6e was formed on a surface of a silicon substrate which was patterned into a region where a gold layer was formed and a region where a thermally oxidized film was exposed.

First, a silicon substrate was prepared, in which a surface was mirror-finished, and a thermally oxidized film was formed on the surface. Then, gold was deposited on a portion of the surface of the silicon substrate by a vacuum evaporation method, and the surface of the silicon substrate was patterned into a region where gold was deposited and a region where the thermally oxidized film was exposed. The silicon substrate was used as the substrate 1.

Next, a fine-particle film composed of the fine particles 2 coated with the protective film molecules 3 was formed by the LB method in substantially the same manner as in Example 1. Namely, 15 μL of the dispersion solution was cast on a water surface with a pipette, and then the solvent was evaporated to form the fine-particle film composed of the fine particles 2 coated with the protective film molecules 3 on the water surface.

Then, the fine-particle film was transferred onto the silicon substrate 1, forming a fine-particle layer 4 composed of the fine particles 2 coated with the protective film molecules 3. In this case, the fine-particle film was disposed to extend over both the region where the gold layer was formed and the region where the thermally oxidized film was exposed.

Next, the substrate 1 on which the fine-particle layer 4 was formed was dipped in a methanol solution of the substituent molecules A for 22 hours by the same method as in Example 1. Then, the substrate 1 was taken out and washed with methanol. This step allows the protective film molecules 3 to be substituted by the substituent molecules A, thereby forming a fine-particle assembly layer 6e having a three-dimensional raised structure 7.

FIG. 9(a) shows a SEM observation image of the fine-particle assembly layer 6e formed as described above. In the region where the gold layer was formed, the fine-particle assembly layer 6e having the three-dimensional raised structure 7 raised in a substantially circular shape was formed. On the other hand, in the region where the thermally oxidized film was exposed, the fine-particle assembly layer 6e having the three-dimensional raised structure 7 raised in a more complicated shape was formed. This result indicates that the three-dimensional raised structure 7 formed varies with changes in the constituent material and properties of the surface of the substrate 1.

FIG. 9(b) shows a SEM observation image of a section of the substrate with the fine-particle assembly layer 6e formed thereon, taken along a line in the region where the thermally oxidized film was exposed. This shows a state in which the fine-particle assembly layer 6e is raised to form the three-dimensional raised structure 7 having a hollow structure.

In Example 3, each of various self-organizing monomolecular films was formed on a surface of a mica substrate on which a gold layer was entirely formed, and a fine-particle assembly layer 6e was formed on each of the monomolecular films.

First, gold was deposited over the entire surface of the mica substrate by a vacuum evaporation method, and each of various self-organizing monomolecular films was further formed thereon. The self-organizing monomolecular films formed were monomolecular films of the following three types of molecules:
(a) 1,10-decanedithiol;
(b) 4-sulfanylpyridine; and
(c) 2-nitro-4-trifluoromethylbenzene-1-thiol.

Each of the three substrates was used as the substrate 1.

Next, a fine-particle film composed of the fine particles 2 coated with the protective film molecules 3 was formed by the LB method in the same manner as in Example 2. Namely, 15 μL of the dispersion solution was cast on a water surface with a pipette, and then the solvent was evaporated to form the fine-particle film composed of the fine particles 2 coated with the protective film molecules 3 on the water surface.

Then, the fine-particle film was transferred onto the silicon substrate 1, thereby producing a fine-particle layer 4e composed of the fine particles 2 coated with the protective film molecules 3.

Next, the substrate 1 on which the fine-particle layer 4e was formed was dipped in a methanol solution of the substituent molecules A for 22 hours by the same method as in Example 2. Then, the substrate 1 was taken out and washed with methanol. This step allows the protective film molecules 3 to be substituted by the substituent molecules A, thereby forming a fine-particle assembly layer 6e having a three-dimensional raised structure 7.

FIG. 10(x) shows a SEM observation image of the fine-particle layer 4e composed of the fine particles 2 coated with the protective film molecules 3 before substitution by the substituent molecules A. In addition, FIGS. 10(a) to (c) show SEM observation images of the fine-particle assembly layers 6e after the protective film molecules 3 of the fine-particle layers 4, which were formed on the self-organizing monomolecular films (a) to (c), respectively, were substituted by the substituent molecules A.

In FIG. 10(a) and FIG. 10(c), a bright (whitish) observed portion corresponds to a raised portion. In FIG. 10(a), a network raised structure is formed, while in FIG. 10(c), a linearly raised structure which extends while being slightly curved is formed. In FIG. 10(b), a raised structure having a wide raised portion and a cleaved top is formed. Comparison with FIG. 10(x) indicates that irregularity due to a raised structure is formed by substitution with the substituent molecules A in the fine-particle assembly layer 6e. The three-dimensional raised structure 7 varies depending on the type of the self-organizing monomolecular film as a base. This indicates that the shape of the three-dimensional raised structure 7 can be controlled by the type of molecules (type of a terminal functional group) constituting the monomolecular film, etc.

In Example 4, a fine-particle assembly layer was formed on a cleaved mica substrate having a thickness of about 0.1 mm.

First, the mica substrate was prepared as the substrate 1.

Next, a fine-particle film composed of the fine particles 2 coated with the protective film molecules 3 was formed by the LB method. First, the gold fine particles 2 coated with the protective film molecules 3 were dispersed in cyclohexane at a concentration of 2% by mass. Then, 60 μL of the resultant dispersion solution was cast on a water surface with a pipette, and then the solvent was evaporated to form the fine-particle film composed of the fine particles 2 coated with the protective film molecules 3 on the water surface.

Then, the fine-particle film was transferred onto the mica substrate 1, producing a fine-particle layer 4e composed of the fine particles 2 coated with the protective film molecules 3.

Next, the substituent molecules C (refer to FIG. 4(c); butanedithiol) were dissolved as the substituent molecules 5 in methanol at a concentration of 1 mM. The substrate 1 on which the fine-particle layer 4e was formed was dipped in the resultant solution for 84 hours. Then, the substrate 1 was taken out and washed with methanol. This treatment allows the protective film molecules 3 to be substituted by the substituent molecules C, thereby forming a fine-particle assembly layer having a absent portion 8.

FIG. 11(x) shows a SEM observation image of the fine-particle layer 4e composed of the fine particles 2 coated with the protective film molecules 3 before substitution by the substituent molecules C. In addition, FIG. 11(a) shows a SEM observation images of the fine-particle assembly layer after the protective film molecules 3 of the fine-particle layer 4e were substituted by the substituent molecules C.

The molecular length of the substituent molecules C is about 0.6 nm and is smaller than the distance of about 1.2 nm between the adjacent fine particle 2 in the fine-particle layer 4e. Example 4 is a case where the molecular length of the substituent molecules 5 having bonding sites at both ends is shorter than a length of twice the molecular length of the protective film molecules 3. In this case, the distance between the fine particles 2 is decreased by the shorter substituent molecule C which enters between the adjacent fine particles 2. As a result, the center-to-center distance between the fine particles 2 in the fine-particle assembly layer is smaller than the center-to-center distance between the fine particles 2 in the fine-particle layer 4e. Therefore, the surface area of the fine-particle assembly layer is also smaller than the surface area of the original fine-particle layer 4e. Thus, the fine-particle assembly layer cannot cover the substrate with the same area as the fine-particle layer 4e, thereby partially forming absent portions, such as cracks or gaps, in portions of the fine-particle assembly layer, the substrate 1 being exposed in these portions.

In fact, in an observation image (FIG. 11(a)) of the fine-particle assembly layer after substitution by the substituent molecules C, absent portions, such as cracks or gaps, produced in portions of the fine-particle assembly layer 6 are observed as dark regions as compared with an observation image (FIG. 11(x)) of the fine-particle layer 4e before substitution by the substituent molecules C.

Although the present disclosure is described based on the example embodiment and the examples, the disclosure is not limited to these examples, and, of course, appropriate changes can be made without deviating from the scope of the gist of the disclosure.

INDUSTRIAL APPLICABILITY

In a method for producing a fine-particle structure/substrate composite member according to the present, a fine-particle assembly layer having a characteristic three-dimensional microstructure can be easily formed without using lithography or the like. The fine-particle structure/substrate composite member having the three-dimensional microstructure can be used as an electronic material for a novel sensor, an electrochemical material for an electrode, and a catalyst according to the material and size of fine particles and the material of a substrate.

REFERENCE SIGNS LIST

1 . . . substrate, 2 . . . fine particles (such as gold nanoparticles), 3 . . . protective film molecules, 4, 4e . . . fine-particle layer composed of fine particles 2 coated with protective film molecules 3, 5a to 5e . . . substituent molecules, 6a to 6e . . . fine-particle assembly layer, 7 . . . three-dimensional raised structure, 8 . . . absent portion, 11 . . . dispersion solution of fine particles 2 coated with protective film molecules 3

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for producing a fine-particle structure/substrate composite member, the method comprising:
  (a) preparing a substrate having a smooth surface;
  (b) forming a fine-particle layer including fine particles which are closely arranged along the surface;
  (c) bonding specified molecules to the fine particles to change the fine-particle layer to a fine-particle assembly layer including the fine particles to which the specified molecules are bonded; and
  (d) increasing the center-to-center distance between the adjacent fine particles to form a three-dimensional microstructure in which the fine-particle assembly layer is raised from the surface within a region; or
  (e) decreasing the center-to-center distance between the adjacent fine particles to form a microstructure in which the fine-particle assembly layer is absent within an absent portion of the surface, the substrate being exposed in the absent portion.

2. The method of claim 1, which includes:
  (a) using, as the fine particles, fine particles coated with protective film molecules that prevent aggregation or fusion of the fine particles; and
  (b) substituting, by the specified molecules, the protective film molecules.

3. The method claim 1, which includes using, as the fine particles, nanoparticles with a nanosize particle diameter.

4. The method of claim 1, wherein molecules each having, as a bonding site bonded to the fine particles, a sulfanyl group —SH, a disulfanyl group —S—S—, an isocyano group —NC, a thiocyanato group —SCN, a carboxyl group —COOH, an amino group —$NH_2$, a cyano group —CN, a selanyl group —SeH, a tellanyl group —TeH, or a phosphino group —$PR^1R^2$ ($R^1$ and $R^2$ are each H or an organic group) are used as the specified molecules.

5. The method claim 1, wherein functional molecules are used as the specified molecules.

6. The method claim 1, wherein the fine-particle layer is formed by a coating method, a printing method, a Langmuir-Blodgett method, a stamp method, a casting method, a liftoff method, or a dipping method.

7. A fine-particle structure/substrate composite member comprising:
   a substrate having a smooth surface; and
   a fine-particle assembly layer including specified molecules bonded to a fine-particle layer, said fine-particle layer including fine particles closely arranged along a region of the substrate surface such that a distance between surfaces of two adjacent particles arranged on the substrate prior to bonding of the specified molecules to said fine particles is a first distance,
   wherein molecular lengths of the specified molecules are greater than the first distance to thereby form a three-dimensional microstructure upon bonding of the specified molecules to the fine particles in which the fine-particle assembly layer is raised from the substrate surface within the region, or
   wherein molecular lengths of the specified molecules are less than the first distance to thereby form a microstructure upon bonding of the specified molecules to the fine particles in which the fine-particle assembly layer is absent within an absent portion of the region, the substrate being exposed in the absent portion.

8. The fine-particle structure/substrate composite member of claim 7, wherein:
   (a) the fine particles in the fine-particle layer are coated with protective film molecules that prevent aggregation or fusion of the fine particles; and
   (b) the protective film molecules are substituted by the specified molecules.

9. The fine-particle structure/substrate composite member of claim 7, wherein the fine particles are nanoparticles having a nanosize particle diameter.

10. The fine-particle structure/substrate composite member of claim 7, wherein the specified molecules are molecules each having, as a bonding site bonded to the fine particles, a sulfanyl group —SH, a disulfanyl group —S—S—, an isocyano group —NC, a thiocyanato group —SCN, a carboxyl group —COOH, an amino group —NH$_2$, a cyano group —CN, a selanyl group —SeH, a tellanyl group —TeH, or a phosphino group and —PR$^1$R$^2$ (R$^1$ and R$^2$ are each H or an organic group).

11. The fine-particle structure/substrate composite member of claim 7, wherein the specified molecules are functional molecules.

12. The fine-particle structure/substrate composite member of claim 11, wherein the fine particles and the functional molecules have conductivity.

13. The fine-particle structure/substrate composite member of claim 12, wherein the fine-particle assembly layer having the three-dimensional microstructure formed therein is used as an electrode.

14. The fine-particle structure/substrate composite member of claim 11, wherein:
   (a) the functional molecules are fluorine-containing molecules; and
   (b) the fine-particle assembly layer forms a super-water-repellent surface.

15. The fine-particle structure/substrate composite member of claim 11, wherein:
   (a) the fine particles and/or the functional molecules have a catalytic function; and
   (b) the fine-particle assembly layer having the three-dimensional microstructure formed therein functions as a catalyst.

16. The fine-particle structure/substrate composite member of claim 7, wherein:
   (a) the substrate serves as an electrode;
   (b) the fine particles and the functional molecules have no conductivity; and
   (c) the electrode is exposed in the absent portion.

17. The fine-particle structure/substrate composite member of claim 7,
   wherein the molecular lengths of the specified molecules are greater than the first distance, and
   wherein the three-dimensional microstructure is selected from the group consisting of a doughnut shape, a circular shape, and a honeycomb shape.

18. The fine-particle structure/substrate composite member of claim 7, wherein the specified molecule is a linear alkane dithiol represented by the formula HS(CH$_2$)$_n$SH, wherein the first distance is about 1.2 nm and wherein $1<n<8$ or $8<n<20$.

* * * * *